(12) United States Patent
Mårtensson et al.

(10) Patent No.: US 12,213,402 B2
(45) Date of Patent: Feb. 4, 2025

(54) ROBOTIC WORK TOOL SYSTEM AND METHOD FOR DEFINING A STAY-OUT AREA WITHIN A WORK AREA

(71) Applicant: HUSQVARNA AB, Huskvarna (SE)

(72) Inventors: Anton Mårtensson, Jönköping (SE); Tommy Glimberg, Nässjö (SE); Sarkan Gazrawi, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 250 days.

(21) Appl. No.: 17/799,802

(22) PCT Filed: Feb. 22, 2021

(86) PCT No.: PCT/SE2021/050145
§ 371 (c)(1),
(2) Date: Aug. 15, 2022

(87) PCT Pub. No.: WO2021/177873
PCT Pub. Date: Sep. 10, 2021

(65) Prior Publication Data
US 2023/0074101 A1  Mar. 9, 2023

(30) Foreign Application Priority Data

Mar. 3, 2020 (SE) .................................... 2050238-1

(51) Int. Cl.
*G05D 1/00* (2024.01)
*A01D 34/00* (2006.01)
*A01D 101/00* (2006.01)

(52) U.S. Cl.
CPC ......... *A01D 34/008* (2013.01); *G05D 1/0214* (2013.01); *G05D 1/0221* (2013.01); *G05D 1/0274* (2013.01); *A01D 2101/00* (2013.01)

(58) Field of Classification Search
CPC ............. A01D 34/008; A01D 2101/00; G05D 1/0214; G05D 1/0221; G05D 1/0274; G05D 1/248; G05D 1/646; G05D 2111/54
(Continued)

(56) References Cited

U.S. PATENT DOCUMENTS

2011/0295423 A1  12/2011  Anderson
2012/0265391 A1  10/2012  Letsky
(Continued)

FOREIGN PATENT DOCUMENTS

CN  108226965 A  *  6/2018  ........... G05D 1/0223
DE  102008001813 A1  *  11/2009  ........... A01D 34/008
(Continued)

OTHER PUBLICATIONS

International Search Report and Written Opinion for PCT Application No. PCT/SE2021/050145, dated Apr. 19, 2021.
(Continued)

Primary Examiner — B M M Hannan
(74) Attorney, Agent, or Firm — Burr & Forman LLP

(57) ABSTRACT

A robotic work tool system (200) for defining a stay-out area (120) within a work area (150). The stay-out area (120) is an area which is to be excluded from the work area (150) in which a robotic work tool (100) is subsequently intended to operate. The robotic work tool system (200) comprises a boundary definition unit (130) comprising at least one position unit (175) configured to receive position data and at least one controller (110, 210). The controller (110, 210) is configured to receive a stay-out area definition trigger signal, which indicates that the boundary definition unit (130) has approached the stay-out area to be defined. The controller (110, 210) is further configured to receive, based on the received signal, position data indicating the present position of the boundary definition unit (130) from the position unit
(Continued)

(175). The controller (110, 210) is further configured to define the stay-out area (120) as an area centered at an offset from the received position data.

20 Claims, 3 Drawing Sheets

(58) Field of Classification Search
USPC .......................................... 701/25; 700/245
See application file for complete search history.

(56) References Cited

U.S. PATENT DOCUMENTS

| | | | |
|---|---|---|---|
| 2013/0110322 A1 | 5/2013 | Jagenstedt et al. | |
| 2017/0344012 A1* | 11/2017 | Kamfors | B60L 50/52 |
| 2018/0168097 A1 | 6/2018 | Yamauchi et al. | |
| 2019/0163174 A1 | 5/2019 | Ko et al. | |
| 2019/0208700 A1 | 7/2019 | Hahn et al. | |
| 2019/0339713 A1* | 11/2019 | Kwak | G01S 13/74 |
| 2019/0369640 A1 | 12/2019 | He et al. | |
| 2020/0037498 A1 | 2/2020 | Ko et al. | |

FOREIGN PATENT DOCUMENTS

| | | | | |
|---|---|---|---|---|
| EP | 2279467 A2 * | 2/2011 | | A01D 34/008 |
| EP | 3018548 A1 * | 5/2016 | | B25J 5/00 |
| EP | 3237984 B1 | 12/2018 | | |
| EP | 3470950 A1 | 4/2019 | | |
| EP | 3018548 B1 * | 3/2020 | | B25J 5/00 |
| WO | 2016103070 A1 | 6/2016 | | |
| WO | WO-2016091312 A1 * | 6/2016 | | A01D 34/008 |
| WO | 2019185930 A1 | 10/2019 | | |

OTHER PUBLICATIONS

Search Report and Office Action for Swedish Application No. 2050238-1 mailed on Oct. 14, 2020.

* cited by examiner

400

ROBOTIC WORK TOOL SYSTEM AND METHOD FOR DEFINING A STAY-OUT AREA WITHIN A WORK AREA

TECHNICAL FIELD

This disclosure relates to a robotic work tool system as well as a method for defining a stay-out area within a work area, wherein the stay-out area is an area that is to be excluded from the work area in which a robotic work tool is subsequently intended to operate.

BACKGROUND

A robotic work tool is an autonomous robot apparatus that is used to perform certain tasks, e.g. for cutting lawn grass. A robotic work tool may be assigned an area, hereinafter referred to as a work area, in which the robotic work tool is intended to operate. This work area may be defined by the perimeter enclosing the work area. This perimeter may include the borders, or boundaries, which the robotic work tool is not intended to cross.

There exist different ways of setting these boundaries for the robotic work tool. Traditionally, the boundaries, or the perimeters, for the work areas have been set manually by a user or operator. The user manually sets up a boundary wire around the area, or lawn, which defines the area to be mowed. A control signal may then be transmitted through the boundary wire. The control signal may preferably comprise a number of periodic current pulses. As is known in the art, the current pulses will typically generate a magnetic field, which may be sensed by the robotic work tool. The robotic work tool may accordingly use these signals from the wire to determine whether the robotic work tool is close to, or is crossing, a boundary wire. As the robotic work tool crosses the boundary wire, the direction of the magnetic field will change. The robotic work tool will be able to determine that the boundary wire has been crossed and take appropriate action to return into the work area. As previously stated, these boundary wires are manually set up and are typically very time consuming to put into place. Once the boundary wires are put into place, the user typically rather not moves them.

In view of the above, other ways to set the boundaries for a robotic work tool have been proposed, namely ways that do not use physical boundary wires. The robotic work tool may use a satellite navigation device and/or a deduced reckoning navigation sensor to remain within a work area by comparing the successive determined positions of the robotic work tool against a set of geographical coordinates defining the boundary of the work area. This set of boundary defining positions may be stored in a memory, and/or included in a digital (virtual) map of the work area.

The above-described non-physical i.e. virtual, boundaries, for a work area may reduce the time necessary for installation and setting the boundaries for the work area. The non-physical boundaries may be smooth to install. Generally, they may be set by using a so-called "walk-the-dog" approach. Then the robotic work tool is driven one lap around the work area in order to establish the set of geographical coordinates defining the boundary of the work area in which the robotic work tool is intended to operate.

SUMMARY

The use of non-physical boundaries has many advantages, for example, the wireless work area perimeter surrounding the complete work area may be time efficient to set up. However, a work area generally also includes areas within the work area that should be excluded, i.e. areas within the work area that the robotic work tool should not enter and in which the robotic work tool should not operate. These areas may be called stay-out areas. The stay-out areas have to be defined one by one and may require a lot of attention from a user in order to be accurately defined. Work areas with a plurality of stay-out areas will accordingly take a lot of time to define.

Thus, there is a need for a solution that speeds up the installation process, while still allowing the work area, with all of its stay-out areas, to be accurately defined.

In view of the above, it is therefore a general object of the aspects and embodiments described throughout this disclosure to provide a solution for defining a stay-out area within a work area in a time efficient, but still accurate, way.

This general object has been addressed by the appended independent claims. Advantageous embodiments are defined in the appended dependent claims.

According to a first aspect, there is provided a robotic work tool system for defining a stay-out area within a work area. The stay-out area is an area which is to be excluded from the work area in which a robotic work tool is subsequently intended to operate. The robotic work tool system comprises at least one boundary definition unit comprising at least one position unit configured to receive position data. The robotic work tool system further comprises at least one controller configured to receive a stay-out area definition trigger signal and to receive, based on the received stay-out area definition trigger signal, position data from the at least one position unit. The position data indicates the present position of the boundary definition unit. The least one controller is further configured to define the stay-out area as an area centered at an offset from the received position data.

In some embodiments, the controller is configured to position an outer perimeter of the stay-out area at the position of the boundary definition unit.

In some embodiments, said offset comprises an offset direction. Said offset direction may be based on a heading of the boundary definition unit.

In some embodiments, said offset comprises an offset distance. Said offset distance may be set based on a size of the stay-out area.

In some embodiments, said offset is a predefined offset.

In some embodiments, the robotic work tool system further comprises a user interface configured to receive user input from a user during the user's operation and interaction with said user interface. The user interface is configured to receive input related to the stay-out area. The at least one controller may further be configured to define the stay-out area based on the received user input.

In some embodiments, said offset comprises an offset distance that is adjustable via the user interface and the received user input determines the offset distance. The received user input may determine a shape of the stay-out area. The shape of the stay-out area may be selectable from a set of predefined shapes in the user interface. For example, the shape of the stay-out area may be at least one from the group comprising: a circle, a square and a rectangle.

In some embodiments, an orientation of the shape of the stay-out area is adjustable via the user interface and the received user input determines the orientation of the shape of the stay-out area.

In some embodiments, an aspect ratio of the shape of the stay-out area is adjustable via the user interface and the received user input determines the aspect ratio of the shape of the stay-out area.

In some embodiments, the stay-out area definition trigger signal is based on input received via the user interface.

In some embodiments, the boundary definition unit further comprises a sensor unit configured to receive sensor data indicating that an object is located in front of the boundary definition unit. The stay-out area definition trigger signal is based on the received sensor data.

In some embodiments, the stay-out area definition trigger signal is based on a signal indicating that the boundary definition unit is not moving. The signal indicating that the boundary definition unit is not moving may be received from at least one from the group comprising: a motor, an odometer and an accelerometer.

In some embodiments, the boundary definition unit is the robotic work tool. The robotic work tool may be a robotic lawn mower.

According to a second aspect, there is provided a method implemented by the robotic work tool system according to the first aspect.

In one exemplary implementation, the method is performed by a robotic work tool system for defining a stay-out area within a work area. The stay-out area is an area which is to be excluded from the work area in which a robotic work tool is subsequently intended to operate. The method comprises receiving a stay-out area definition trigger signal and receiving, based on the received stay-out area definition trigger signal, position data. The position data indicates the present position of the boundary definition unit. The method further comprises defining the stay-out area as an area centered at an offset from the received position data.

In some embodiments, the method further comprises positioning an outer perimeter of the stay-out area at the position of the boundary definition unit.

In some embodiments, the method comprises defining the stay-out area based on received user input.

Some of the above embodiments eliminate or at least reduce the problems discussed above. A robotic work tool system and method are thus provided which in a time-efficient manner may define stay-out areas such that an installation process may be performed in an easier way. By defining the stay-out area as an area centred at an offset from received position data when a stay-out area definition trigger signal is received, it may be possible to in a fast and simple manner define an accurate stay-out area without having to drive the boundary definition unit around the stay-out area. The boundary definition unit only has to be driven close to the stay-out area to be defined in order to define the stay-out area and thus, the timed needed for the definition of stay-out areas is largely reduced and the process simplified. Furthermore, as the centre of the stay-out area is based on the position of the boundary definition unit, the stay-out area will be more accurately defined than if the stay-out area is located freely by a user, without any relation to any known reference point such as the position of the boundary definition unit.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
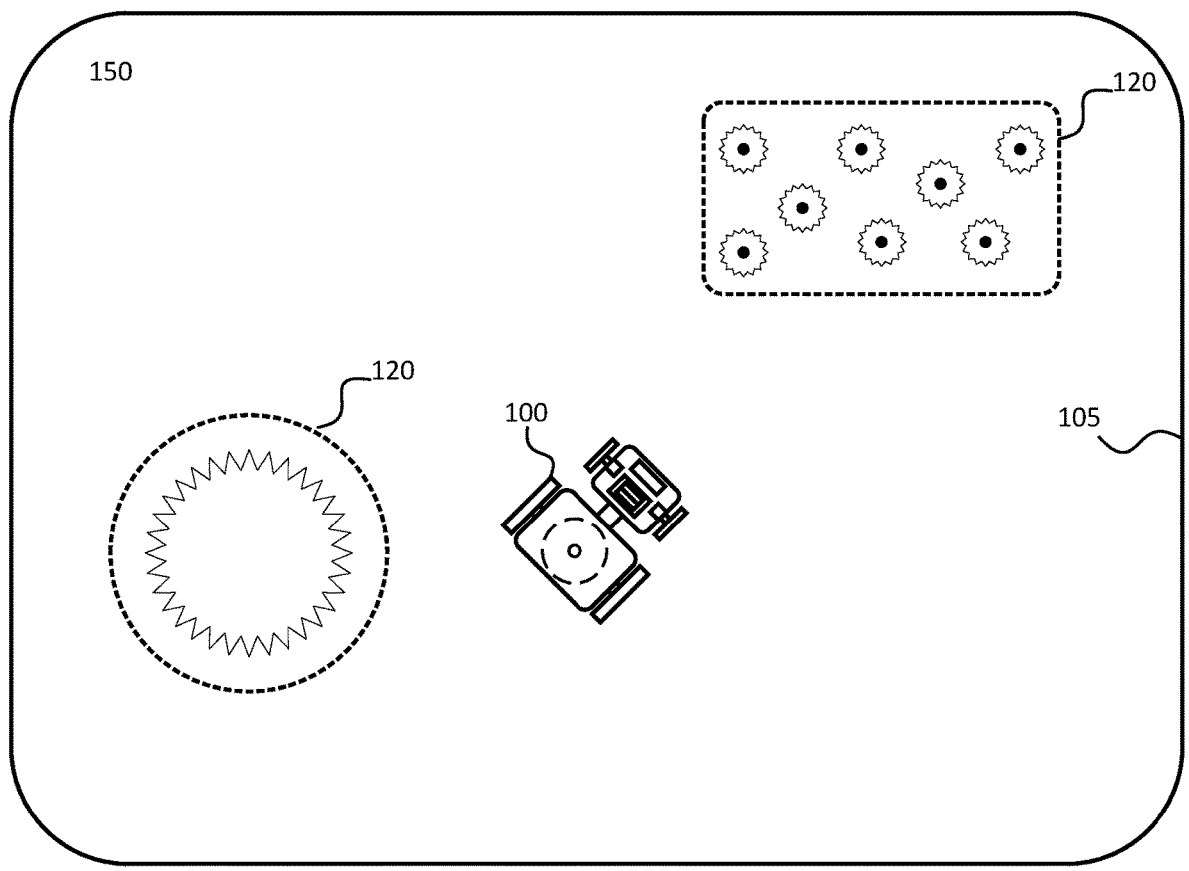
FIG. 1 shows a schematic overview of a robotic work tool within a work area.

In one of its aspects, the disclosure presented herein concerns a robotic work tool system for defining a stay-out area within a work area. FIG. 1 illustrates a schematic overview of a robotic work tool 100 in such a work area 150. As will be appreciated, the schematic view is not to scale. If the work area 150 is a lawn and the robotic work tool 100 is a robotic lawn mower, the work area 150 is the area to be mowed by the robotic work tool 100. As seen in FIG. 1, the work area 150 is surrounded by a work area perimeter 105. The work area perimeter 105 sets the boundaries for the work area 150, i.e. defines the boundaries for the work area 150. The robotic work tool 100 is intended to operate within the work area 150 and remain within this area due to the work area perimeter 105. The robotic work tool 100 will not cross this perimeter 105 and only operate within the enclosed area, i.e. the work area 150.

As further illustrated in FIG. 1, the work area 150 further comprises two stay-out areas 120. The stay-out areas 120 within FIG. 1 are illustrated as a flowerbed and as a bush. A stay-out area 120 is an area that is to be excluded from the work area 150 in which the robotic work tool 100 operates. A stay-out area 120 is located within the work area 150. The stay-out area 120 may be fully enclosed by the work area 150. By defining stay-out areas 120, it may be ensured that the robotic work tool 100 will not operate within these areas. This may be used to protect, for example, flowerbeds and bushes, or to prevent the robotic work tool 100 to travel into restricted areas such as ponds and areas that may damage the robotic work tool 100. Thus, stay-out areas 120 are areas within the work area 150 that for different reasons should not be entered by a robotic work tool 100.

Figure 2:
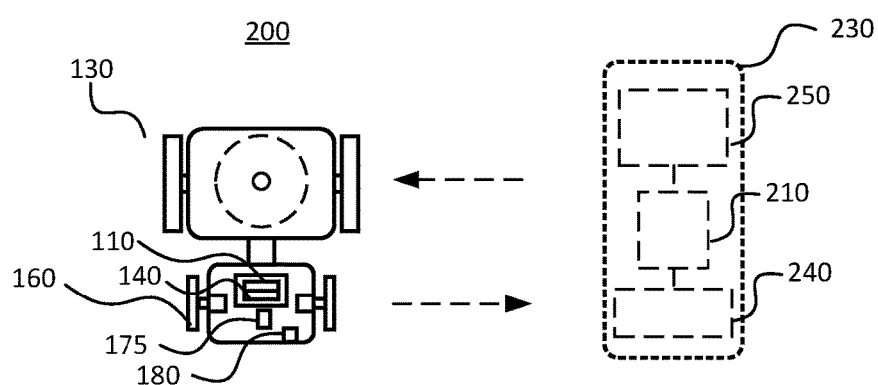
FIG. 2 illustrates a schematic view of a robotic work tool system according to one embodiment.

With reference to FIG. 2, a first embodiment according to the first aspect will now be described. FIG. 2 shows a schematic view of a robotic work tool system 200. As will be appreciated, the schematic view is not to scale. The robotic work tool system 200 comprises at least one boundary definition unit 130 and at least one controller 110, 210. The robotic work tool system 200 will mainly be described in general terms of a robotic work tool system 200 for defining a stay-out area 120 within a work area 150, such as a lawn. However, it should be understood that the robotic work tool system 200 described herein may be implemented together with any type of autonomous machine that may perform a desired activity within a desired work area. Examples of such types of autonomous machines include, without limitation, cleaning robotic work tools, polishing work tools, repair work tools, surface-processing work tools (for indoors and/or outdoors), and/or demolition work tool or the like.

The boundary definition unit 130 of the robotic work tool system 200 may be, for example, the robotic work tool 100, which is subsequently intended to operate within the work area 150. Alternatively, the at least one boundary definition unit 130 may be a device used for defining the stay-out area 120, which is a device separated from the robotic work tool 100 and which is not intended to subsequently operate within the work area 150.

The boundary definition unit 130 illustrated in FIG. 2 is exemplified as a robotic work tool 100, but it may be appreciated that it may be exemplified in a variety of ways. The robotic work tool 100 may be, for example, a robotic lawnmower. FIG. 2 shows a boundary definition unit 130 having a body and a plurality of wheels 160. The wheels 160 of the boundary definition unit 130 are to illustrate that the boundary definition unit 130 is movable. In other embodiments, the wheels 160 may be embodied as, for example, caterpillar threads. In still other embodiments, the boundary definition unit 130 itself is not movable, but may be moved, for example, by a user. This may be the case, for example, when the boundary definition unit 130 is embodied as a smartphone.

As also illustrated in FIG. 2, the boundary definition unit 130 comprises at least one position unit 175 configured to receive position data or a positioning signal. The position unit 175 may comprise a satellite signal receiver, which may be a Global Navigation Satellite System (GNSS) satellite signal receiver. An example of such a system is Global Positioning System (GPS). The position unit 175 may be configured to use, for example, Real-Time Kinematic, RTK, positioning. In advantageous embodiments, the at least one position unit 175 may use RTK-GNSS positioning. A RTK-GNSS system is based on satellite communication. The at least one position unit 175 may be connected to the at least one controller 110, 210 of the robotic work tool system 200 for enabling the controller 110, 210 to determine current positions for the boundary definition unit 130.

In some embodiments, the at least one position unit 175 may further comprise a deduced reckoning navigation sensor for providing signals for deduced reckoning navigation, also referred to as dead reckoning. Examples of such deduced reckoning navigation sensors are odometers, inertial measurement units (IMUs) and compasses. These may comprise, for example, wheel tick counters, accelerometers and gyroscopes. Additionally, visual odometry may be used to strengthen the dead reckoning accuracy further. Thus, in some embodiments, the at least one controller 110, 210 may be configured to use dead reckoning to extrapolate the position data if the quality, or the strength, of the position data received from the satellite signal receiver goes below an acceptable level. The dead reckoning may then be based on the last known position received from the satellite signal receiver.

As may be appreciated, in some embodiments, the robotic work tool system 200 may comprise a plurality of boundary definition units 130. The plurality of boundary definition units may be used to define stay-out areas 120 simultaneously. This may be used if the work area 150, for example, is very large. The plurality of boundary definition units 130 may define, for example, stay-out areas 120 within different parts of the work area 150. Thereafter, each stay-out area 120, defined by the plurality of boundary definition units 120, may be added to the common work area 150, such that one work area 150 with the defined stay-out areas 120 is created. By using a plurality of boundary definition units 130, the defining of the stay-out areas 120 may be performed more quickly.

As previously described, the robotic work tool system 200 comprises at least one controller 110, 210. The at least one controller 110, 210 may be, for example, a controller 110 located in the boundary definition unit 130. In such embodiments, the boundary definition unit 130 corresponds to the robotic work tool system 200. According to another example, the at least one controller 110, 210 may be located in a device 230 that is separated from the boundary definition unit 130. Embodiments with a remote controller 210 located in a device 230 remote from the boundary definition unit 130 may be advantageous when several boundary definition units 130 are operating to define stay-out areas 120 within a work area 150. The remote controller 210 may then add all defined stay-out areas 120, which are based on data received from the plurality of boundary definition units 130, into one common work area 150. When the at least one controller 210 is located in another device 230 than in the boundary definition unit 130, the separate device 230 is communicatively coupled to the boundary definition unit 130. They may be communicatively coupled to each other by a wireless communication interface. Additionally, or alternatively, the wireless communication interface may be used to communicate with other devices, such as servers, personal computers or smartphones, charging stations, remote controls, other robotic work tools or any remote device, which comprises a wireless communication interface and a controller. Examples of such wireless communication are Bluetooth®, Global System Mobile (GSM), Long Term Evolution (LTE) and 5G or New Radio (NR), to name a few.

In one embodiment, the at least one controller 110, 210 is embodied as software, e.g. remotely in a cloud-based solution. In another embodiment, the at least one controller 110, 210 may be embodied as a hardware controller. The at least one controller 110, 210 may be implemented using any suitable, publicly available processor or Programmable Logic Circuit (PLC). The at least one controller 110, 210 may be implemented using instructions that enable hardware functionality, for example, by using executable computer program instructions in a general-purpose or special-purpose processor that may be stored on a computer readable storage medium (disk, memory etc.) to be executed by such a processor. The controller 110, 210 may be configured to read instructions from a memory 140, 240 and execute these instructions to control the operation of the at least one boundary definition unit 130 including, but not being limited to, the propulsion of the at least one boundary definition unit 130 including. The memory 140, 240 may be implemented using any commonly known technology for computer-readable memories such as ROM, RAM, SRAM, DRAM, FLASH, DDR, SDRAM or some other memory technology.

Figure 3A:
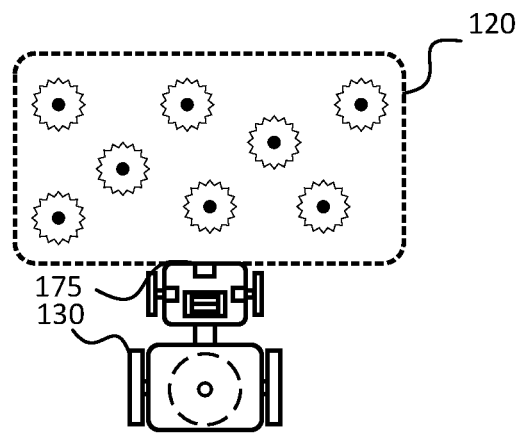
FIGS. 3a and 3b show an example embodiment of a boundary definition unit and a stay-out area.
Figure 3B:
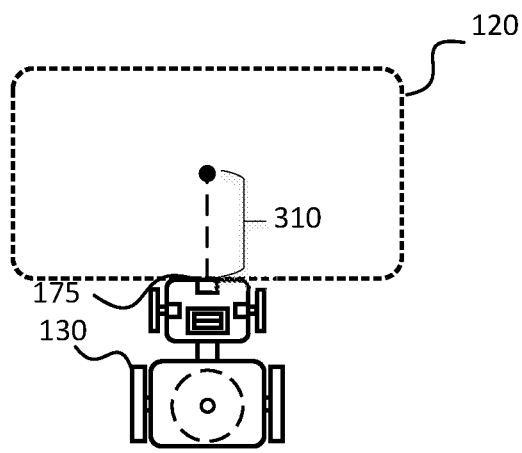

The present disclosure is now going to be described with reference to FIGS. 3a and 3b. FIG. 3a illustrates an example of a boundary definition unit 130 moving within an area comprising a stay-out area 120. As will be appreciated, the schematic view is not to scale. The boundary definition unit 130 in FIG. 3a is approaching a flowerbed. The flowerbed exemplifies a stay-out area 120, i.e. an area that is to be excluded from a work area 150. The aim of the present robotic work tool system 200 is to define the stay-out area 120 such that the robotic work tool 100 that is subsequently intended to operate within the work area 150 does not drive into the flowerbed, i.e. the stay-out area 120. The present robotic work tool system 200 defines the boundaries of the stay-out area 120 such that the robotic work tool 10 does not cross the boundaries surrounding the flowerbed. As the stay-out area 120 keeps the robotic work tool 100 away from areas that the robotic work tool 100 should not enter, it is important that the stay-out area 120 is accurately defined. If the stay-out area 120 is not correctly defined, the robotic work tool 100 may still enter into parts of the stay-out area 120. The present disclosure provide a robotic work tool system 200 that defines a stay-out area 120 in an easy and accurate way.

According to the present disclosure, the at least one controller 110, 210 is configured to receive a stay-out area definition trigger signal. The stay-out area definition trigger signal is a signal that indicates that the boundary definition unit 130 has approached a stay-out area to be defined, i.e. the stay-out area which should be defined by the robotic work tool system 200. Accordingly, the stay-out area definition trigger signal is a signal that starts, or triggers, the process of defining the stay-out area 120. Based on the received stay-out area definition trigger signal, the at least one controller 110, 210 is configured to receive position data from the at least one position unit 175. The position data indicates the present position of the boundary definition unit 130. The at least one controller 110, 210 is thereafter configured to define the stay-out area 120 as an area centered at an offset 310 from the received position data. This is illustrated in FIG. 3b. Accordingly, when the boundary definition unit 130 has approached the flowerbed, the at least one controller 110, 210 is configured to define the stay-out area 120 as an area with a center that is located a certain offset 310 from the previously received position.

By introducing the above proposed robotic work tool system 200, the previously described disadvantages are eliminated or at least reduced. With the provided robotic work tool system 200, it is possible to define a stay-out area 120 within a work area 150 in a time efficient, but still accurate, manner. The boundary definition unit 130 does not have to define a stay-out area 120 by travelling around the area. Instead, the boundary definition unit 130 just have to approach the stay-out area 120 in order for it to be defined by the robotic work tool system 200. A signal which indicates that a stay-out area 120 should be defined, i.e. a stay-out area definition trigger signal, is received and then the stay-out area 120 is defined based on the position of the boundary definition unit 130. Thus, a simplified process for defining stay-out areas 120 is achieved and the overall time for defining a work area 150 with at least one stay-out area 120 may be reduced.

The geographical coordinates defining the boundary of the stay-out area 120 may be stored in a memory 140, 240 and/or included in a digital (virtual) map of the work area 150. Thus, when a robotic work tool 100 subsequently operates within the work area 150, the robotic work tool 100 may use a satellite navigation device and/or a deduced reckoning navigation sensor to remain outside the stay-out areas 120, but within the work area 150. This may be achieved by comparing the successive determined positions of the robotic work tool 100 against the set of geographical coordinates defining the boundary of the work area 150 and the boundary of the stay-out areas 120.

In some embodiments, the at least one controller 110, 210 may further be configured to position an outer perimeter of the stay-out area 120 at the position of the boundary definition unit 130. The outer perimeter corresponds to the outer edge of the stay-out area 120, regardless of the shape of this area. Thus, when looking at FIG. 3b, this means that the perimeter of the flowerbed will be defined to be located at the boundary definition unit's 130 position, and the center of the stay-out area 120 will be defined to be located at the offset 310 from the received position data. This may be advantageous in work areas 150 where a plurality of stay-out areas 120 with the approximately same size is located. The position of the boundary definition unit 130 may be reflected by the position data received by the position unit 175. In some embodiments, the position of the boundary definition unit 130 corresponds to the edge of the boundary definition unit 130. In FIG. 3b, the front edge of the boundary definition unit 130 corresponds to the position of the boundary definition unit 130. However, it should be realized that in embodiments where the position unit 175 reflects positions with a very high accuracy, such as when RTK is utilized, the position of the position unit 175 would not be the same as the position of the boundary definition unit 130. In these embodiments, the received position data may be used to reflect the position of the boundary definition unit 130, even if it, unprocessed, does not exactly mirror the boundary definition unit's position.

The offset 310 from the received position data, which defines the center of the stay out area, may comprise an offset direction in some embodiments. The offset direction may be based on, for example, a heading of the boundary definition unit 130. Alternatively, or additionally, the offset 310 may comprise an offset distance. For example, the offset distance may be set based on a size of the stay-out area 120. Thus, by defining the offset by at least one of an offset distance and an offset direction, it may be possible to control the size, shape and position of the stay-out area 120 to be defined more accurately and it may be possible to adapt a stay-out area 120 to current conditions.

In some embodiments, the offset may be a predefined offset. Thus, as soon as the stay-out area definition trigger signal and the position data indicating the position of the boundary definition unit 130 are received, the stay-out area 120 is defined as an area centered at the predefined offset from the received position data. The predefined offset may comprise a predefined offset direction or a predefined offset distance or both a predefined offset direction and distance. Using a predefined offset may be advantageous when it is desirable that the stay-out areas 120 are defined quickly. Furthermore, it may be advantageous when a plurality of stay-out areas 120 of similar sizes is located within the work area 150.

The robotic work tool system 200 may further comprise a user interface 250, as illustrated in FIG. 2. The user interface 250 may for example be a touch user interface. The user interface 250 may be in an apparatus 230 separated from the boundary definition unit 130, but it may be appreciated that the user interface 250 may be located at the boundary definition unit 130. The user interface 250 may be in the same apparatus as the at least one controller 110, 210.

However, in one embodiment the user interface 250 may be located in a device separate from the at least one controller 110, 210.

In some embodiments, when the boundary definition unit 130 for example is a smart phone, the user interface 250, the at least one controller 110 and the position unit 175 may all be comprised in the smart phone and thus, the robotic work tool system 200 may correspond to the smart phone.

The user interface 250 may be configured to display the defined stay-out area 120. It may be displayed to a user/operator who is operating the user interface 250. In one embodiment, the defined stay-out area 120 may be displayed in the user interface 250 associated with the work area 150.

The user interface 250 may be configured to receive user input from a user during the user's operation and interaction with said user interface 250. The user interface 250 may be configured to receive input related to the stay-out area 120.

In one embodiment, the at least one controller 110, 210 may further be configured to define the stay-out area 120 based on the received user input. For example, the offset, with which the stay-out area 120 is defined to be centered from the received position data, may be adjustable via the user interface 250. The offset may be adjustable such that a predetermined offset may be set via the user interface 250. Alternatively, the offset may be adjustable in such way that it may be set via the user interface 250 once the at least one controller 110, 210 receives the stay-out area definition trigger signal and the position data indicating the position of the boundary definition unit 130.

In embodiments where said offset comprises an offset distance, the offset distance may be adjustable via the user interface 250. The received user input may determine the offset distance. Additionally, or alternatively, if said offset comprises an offset direction, the offset direction may be adjustable via the user interface 250 and the received user input may determine the offset direction.

In one embodiment, the received user input may determine a shape of the stay-out area 120. The shape of the stay-out area 120 may be selectable from a set of predefined shapes in the user interface 250. For example, the shape of the stay-out area 120 may be at least one from the group comprising: a circle, a square and a rectangle. The shape of the stay-out area 120 may be set such that it is automatically set to a certain shape once a stay-out area definition trigger signal is received. Alternatively, the shape of the stay-out area 120 may be selected via the user interface 250 once the stay-out area definition trigger signal is received. In such embodiments, it may be selected which of the predetermined shapes that best matches the stay-out area 120 that is to be defined. This may be preferable if many differently shaped stay-out areas 120 are located within the work area 150.

In one embodiment, an orientation of the shape of the stay-out area 120 may be adjustable via the user interface 250. The received user input may then determine the orientation of the shape of the stay-out area 120. Additionally, or alternatively, an aspect ratio of the shape of the stay-out area 120 may be adjustable via the user interface 250. The received user input may then determine the aspect ratio of the shape of the stay-out area 120 and thus a size of the stay-out area 120 may be determined. For example, if the stay-out area 120 may have the shape of a rectangle, the aspect ratio may determine the width of the rectangle.

By providing a user interface 250 as described above, a fast and simple adaptation of a stay-out area 120 may be achieved.

As previously described, the robotic work tool system 200 starts defining a stay-out area 120 when a stay-out area definition trigger signal is received. The stay-out area definition trigger signal may be based on different types of input. In one embodiment, the stay-out area definition trigger signal may be based on input received via the user interface 250. Thus, a user may indicate via the user interface 250 that the boundary definition unit 130 is located at a stay-out area 120 and that a stay-out area 120 should be defined. According to this embodiment, the boundary definition unit 130 may be driven to a stay-out area 120, and then the stay-out area definition trigger signal may be initiated via the user interface 250. This will subsequently initiate the process of defining the stay-out area 120.

In one embodiment, the stay-out area definition trigger signal may be based on received sensor data. In this embodiment, the boundary definition unit 130 further comprises a sensor unit 180 configured to receive sensor data indicating that an object is located in front of the boundary definition unit 130. Thus, the boundary definition unit 130 may detect an object in front of the boundary definition unit 130 and this may trigger the stay-out area definition trigger signal such that a stay-out area 120 is defined. The sensor unit 180 may be configured to obtain sensed input data. The obtained sensed input data may be, without limitations, photo data, odometric data, position data, direction data etc. The at least one sensor unit 180 may be, for example, at least one of a camera, a radar sensor, a lidar sensor, an ultrasonic sensor, a compass and, a position unit.

In still one embodiment, the stay-out area definition trigger signal may be based on a signal indicating that the boundary definition unit 130 is not moving. Thus, when the boundary definition unit 130 does not move, this is an indication that the boundary definition unit 130 is located at a stay-out area 120 and that a stay-out area 120 should be defined. For example, the signal indicating that the boundary definition unit 130 is not moving may be received from at least one from the group comprising: a motor, an odometer and an accelerometer.

It may be appreciated that in still one embodiment the stay-out area definition trigger signal may be based on a combination of different types of input. Without limitations, the stay-out area definition trigger signal may be based on, for example, input received both via received sensor data and via the user interface 250. In such embodiment, the stay-out area definition trigger signal may not be generated, for example, until the sensor data indicates that the boundary definition unit 130 is located at a stay-out area 120 and this has been confirmed by input data received via the user interface 250. Several other combinations of different types of input are possible, and the described embodiment is just to illustrate an example.

Accordingly, the present robotic work tool system 200 provides a time efficient and accurate solution for defining a stay-out area 120. The robotic work tool system 200 makes it possible to define a stay-out area 120 easily, without having to drive a boundary definition unit 130 around the stay-out area 120 to be defined. It will be enough for the boundary definition unit 130 to approach the stay-out area 120 in order to define it. Furthermore, as the stay-out area 120 will be defined as an area centered at an offset from received position data, the location of the stay-out area 120 will be accurately reflected and thus, creating the stay-out areas 120 at the locations where they should be. Accordingly, with the proposed system, a more accurately defined work area, with correctly defined stay-out areas 120 will be created.

In some embodiments, the boundary definition unit 130 is a robotic work tool 100. In one advantageous embodiment, the robotic work tool 100 may be a robotic lawn mower.

According to a second aspect, there is provided a method implemented in the robotic work tool system 200 according to the first aspect. The method will be described with reference to FIG. 4.

Figure 4:
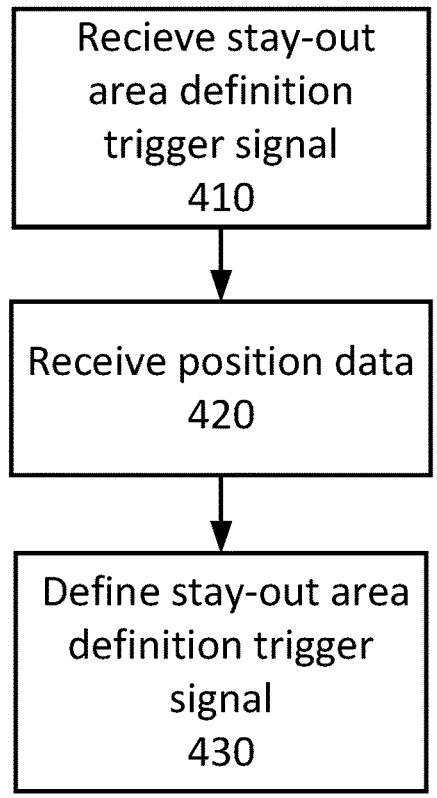
FIG. 4 shows a flowchart of an example method performed by a robotic work tool system.

In one embodiment, the method 400 may be performed by a robotic work tool system 200 for defining a stay-out area 120 within a work area 150. The stay-out area 120 is an area that is to be excluded from the work area 150 in which a robotic work tool 100 is subsequently intended to operate. As illustrated in FIG. 4, the method 400 starts with step 410 of receiving a stay-out area definition trigger signal. The stay-out area definition trigger signal is a signal that indicates that a boundary definition unit 130 has approached the stay-out area to be defined. The method 400 further comprises the step 420 of receiving, based on the received stay-out area definition trigger signal, position data. The position data indicates the present position of the boundary definition unit 130. Thereafter, the method 400 continues with step 430 of defining the stay-out area 120 as an area centered at an offset from the received position data.

With the proposed method 400 it may be possible to define a stay-out area 120 within a work area 150 in a time efficient, but still accurate way. By defining a stay-out area 120 based on a position of the boundary definition unit 130 when a stay-out area definition trigger signal is received, it is possible to define stay-out areas 120 without having to guide the boundary definition unit 130 around the area. Furthermore, as the stay-out area 120 is defined based on position data indicating the present position of the boundary definition unit 130, the stay-out area may also be accurately defined.

In some embodiments, the method 400 further comprises positioning an outer perimeter of the stay-out area at the position of the boundary definition unit 130.

In some embodiments, the method 400 comprises defining the stay-out area 120 based on received user input. By further defining the stay-out area 120 based on user input, the method 400 may be possible to influence the stay-out area 120 to be defined.

Figure 5:
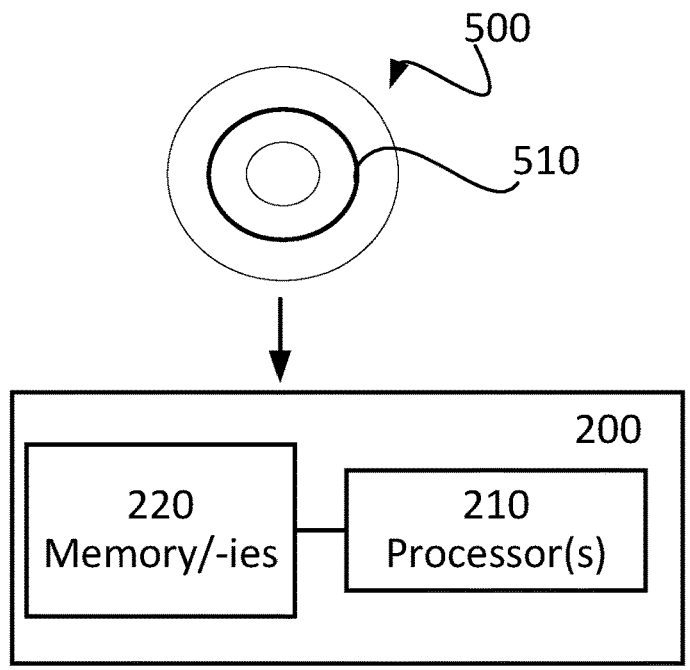
FIG. 5 shows a schematic view of a computer-readable medium according to the teachings herein.

FIG. 5 shows a schematic view of a computer-readable medium as described in the above. The computer-readable medium 500 is in this embodiment a data disc 500. In one embodiment, the data disc 500 is a magnetic data storage disc. The data disc 500 is configured to carry instructions 510 that when loaded into a controller, such as a processor, execute a method or procedure according to the embodiments disclosed above. The data disc 500 is arranged to be connected to or within and read by a reading device, for loading the instructions into the controller. One such example of a reading device in combination with one (or several) data disc(s) 500 is a hard drive. It should be noted that the computer-readable medium can also be other mediums such as compact discs, digital video discs, flash memories or other memory technologies commonly used. In such an embodiment, the data disc 500 is one type of a tangible computer-readable medium 500.

The instructions 510 may also be downloaded to a computer data reading device, such as the controller 110, 210 or other device capable of reading computer coded data on a computer-readable medium, by comprising the instructions 510 in a computer-readable signal which is transmitted via a wireless (or wired) interface (for example via the Internet) to the computer data reading device for loading the instructions 510 into a controller. In such an embodiment, the computer-readable signal is one type of a non-tangible computer-readable medium 500.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic work tool system for defining a stay-out area within a work area, wherein the stay-out area is an area which is to be excluded from the work area in which a boundary definition unit is intended to operate, the robotic work tool system comprising:
the boundary definition unit comprising a position unit configured to receive position data;
a controller configured to:
receive a stay-out area definition trigger signal, wherein the stay-out area definition trigger signal is a signal that indicates that the boundary definition unit has approached the stay-out area to be defined;
receive, based on the received stay-out area definition trigger signal, position data from the position unit, wherein the position data indicates a present position of the boundary definition unit; and
define the stay-out area as an area centered at an offset from the received position data.

2. The robotic work tool system according to claim 1, wherein the controller is configured to position an outer perimeter of the stay-out area at the present position of the boundary definition unit.

3. The robotic work tool system according to claim 1, wherein said offset comprises an offset direction.

4. The robotic work tool system according to claim 3, wherein said offset direction is based on a heading of the boundary definition unit.

5. The robotic work tool system according to claim 1, wherein said offset comprises an offset distance.

6. The robotic work tool system according to claim 5, wherein said offset distance is set based on a size of the stay-out area.

7. The robotic work tool system according to claim 1, wherein said offset is a predefined offset.

8. The robotic work tool system according to claim 1, wherein the robotic work tool system further comprises a user interface configured to receive user input from a user during the user's operation and interaction with said user interface, wherein the user interface is configured to receive input related to the stay-out area.

9. The robotic work tool system according to claim 8, wherein the controller further is configured to define the stay-out area based on the received user input.

10. The robotic work tool system according to claim 9, wherein said offset comprises an offset distance that is adjustable via the user interface and the received user input determines the offset distance.

11. The robotic work tool system according to claim 9, wherein the received user input determines a shape of the stay-out area.

12. The robotic work tool system according to claim 11, wherein the shape of the stay-out area is selectable from a set of predefined shapes in the user interface.

13. The robotic work tool system according to claim 12, wherein the shape of the stay-out area is at least one from a group comprising: a circle, a square and a rectangle.

14. The robotic work tool system according to claim 11, wherein an orientation of the shape of the stay-out area is adjustable via the user interface and the received user input determines the orientation of the shape of the stay-out area.

15. The robotic work tool system according to claim 11, wherein an aspect ratio of the shape of the stay-out area is adjustable via the user interface and the received user input determines the aspect ratio of the shape of the stay-out area.

16. The robotic work tool system according to claim 8, wherein the stay-out area definition trigger signal is based on input received via the user interface.

17. The robotic work tool system according to claim 1, wherein the boundary definition unit further comprises a sensor unit configured to receive sensor data indicating that an object is located in front of the boundary definition unit and wherein the stay-out area definition trigger signal is based on the received sensor data.

18. The robotic work tool system according to claim 1, wherein the stay-out area definition trigger signal is based on a signal indicating that the boundary definition unit is not moving, and wherein the signal indicating that the boundary definition unit is not moving is received from at least one from a group comprising: a motor, an odometer and an accelerometer.

19. The robotic work tool system according to claim 1, wherein the boundary definition unit is a robotic work tool, and the robotic work tool is a robotic lawn mower.

20. A method performed by a robotic work tool system for defining a stay-out area within a work area, wherein the stay-out area is an area which is to be excluded from the work area in which a robotic work tool is intended to operate, wherein the method comprises:

receiving a stay-out area definition trigger signal, wherein the stay-out area definition trigger signal is a signal that indicates that a boundary definition unit has approached the stay-out area to be defined;

receiving, based on the received stay-out area definition trigger signal, position data, wherein the position data indicates the present position of the boundary definition unit; and defining the stay-out area as an area centered at an offset from the received position data.

* * * * *